Figure 1B:
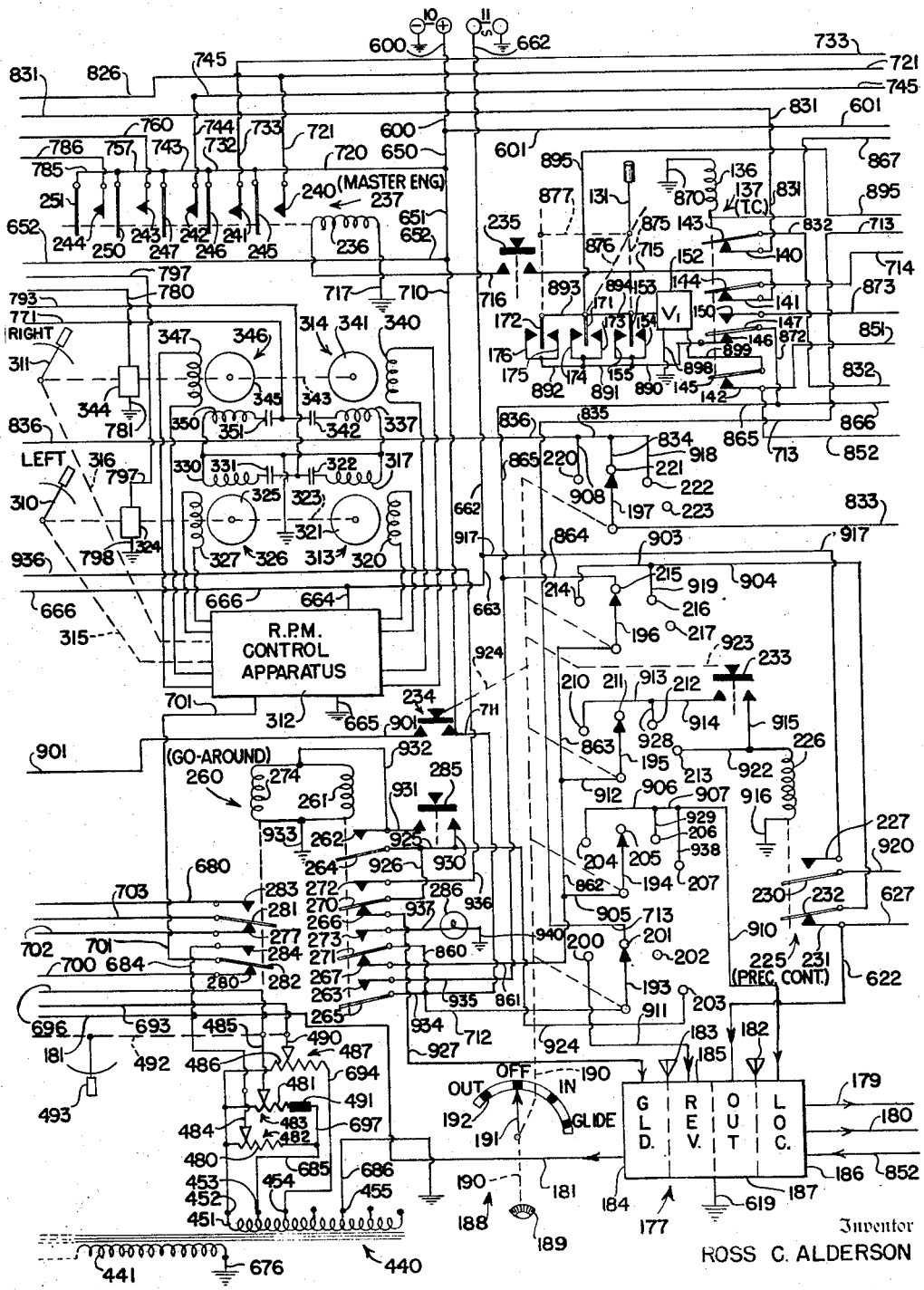

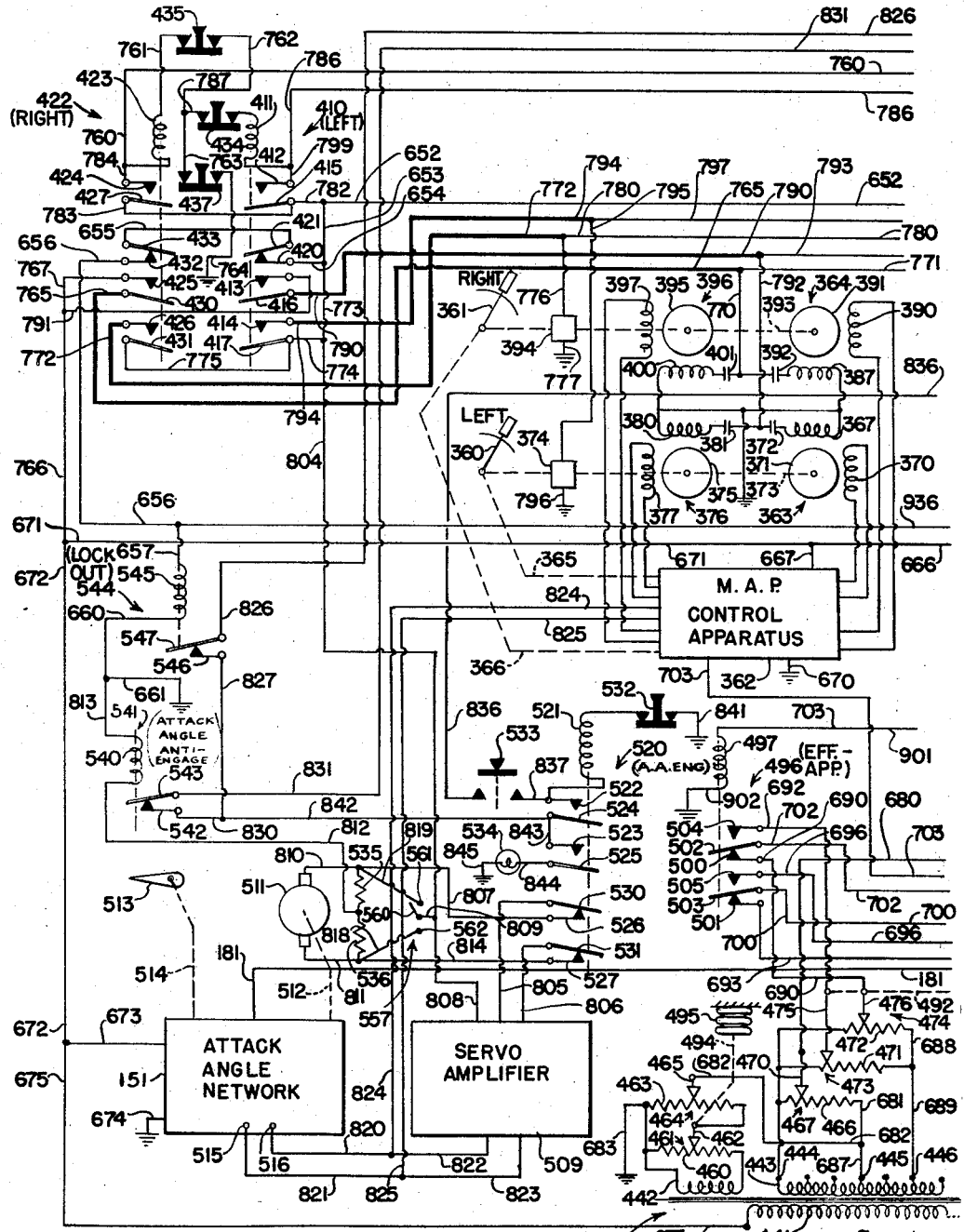

Sept. 23, 1958    R. C. ALDERSON    2,853,254
APPARATUS FOR AIRCRAFT CONTROL
Filed Jan. 18, 1951    3 Sheets-Sheet 3

Inventor
ROSS C. ALDERSON
By
George H. Fisher
Attorney

United States Patent Office 2,853,254
Patented Sept. 23, 1958

2,853,254
APPARATUS FOR AIRCRAFT CONTROL

Ross C. Alderson, Minneapolis, Minn., assignor to Minneapolis-Honeywell Regulator Company, Minneapolis, Minn., a corporation of Delaware Application January 18, 1951, Serial No. 206,577

9 Claims. (Cl. 244—77)

The invention relates to the field of aircraft control, and more particularly to apparatus for stabilizing the attack angle of a craft and its attitude about three axes so that it proceeds with a predetermined heading along a selected flight path which may be level or sloping, the airspeed of the craft varying as necessary to produce the desired flight.

The understanding of the objects of the invention will be facilitated by an initial general statement as to the characteristics of the apparatus components which cooperate to make up the invention. These components include attitude stabilizing apparatus, power stabilizing apparatus, attack angle control apparatus, and instrument landing apparatus.

In the embodiment of the invention shown in the drawing, the attitude stabilizing apparatus, or automatic pilot, includes gyroscopic apparatus for establishing standards of attitude for the craft about each of its axes, and servomotor apparatus for operating the attitude control members of the craft whenever it departs from a desired attitude. The automatic pilot includes a control stick for manually changing the attitude of the craft about any axis, and a turn control knob for causing the craft to change heading in a coordinated fashion.

The power stabilizing apparatus includes throttle control apparatus and propeller governor control apparatus, the operation of both being regulated by a single power control device or selector which determines selected values for engine power and speed.

The throttle control apparatus includes means responsive to throttle position and to absolute intake manifold pressure (MAP), in addition to the engine power selector just mentioned, and also includes servomotor apparatus for adjusting the throttle levers until the desired engine power is being delivered, as measured by the actual MAP or by throttle position when the MAP values become unreliable.

The propeller governor control apparatus includes means responsive to engine governor position and to differential R. P. M. between the two engines in addition to the speed selector mentioned above, and also includes servomotor apparatus for adjusting the R. P. M. levers until engines are operating at the desired speed, as measured by R. P. M. lever position.

The attack angle control apparatus is a self-balancing arrangement in which actual and selected attack angles are compared. In a "centering" condition of this arrangement the selected attack angle is adjusted to identify with the actual attack angle: in its "controlling" condition a signal is supplied to modify the operation of the power stabilizing apparatus, changing the actual attack angle so as to reduce the signal to zero, and resulting in flight at a constant attack angle. This, combined with stabilized attitude, results in flight at a constant altitude and air speed; combined further with the effect of the glide path receiver, the result is descending flight along the glide path. In normal descent the negative rate of climb and the air speed are both substantially constant.

The instrument landing apparatus includes means giving a localizer signal, whenever the craft departs in azimuth from a desired landing path, and a glide path signal, whenever the craft departs in elevation from the landing path. Means are provided for changing the heading of the craft in accordance with the localizer signal and for changing the selected attack angle in accordance with the glide path signal.

A function selector having a normal Off position is provided for the principal purpose of coordinating the apparatus as a whole for the final Glide or for simple localizer control In—that is, toward the airport or Out—that is, away from the airport.

It has been found that the ratio and ranges of adjustment of MAP and R. P. M. are not the same for most efficient flight as they are for safest flight during approaches. The power stabilizing apparatus is accordingly provided with an Efficiency-Approach switch and relay which alternatively make effective in the power stabilizing apparatus one or the other of two sets of selectors according to the type of flight being conducted.

The over-all apparatus has in view control of aircraft not only in flight over land areas but also in flight over water and in landings on aircraft carriers. A further problem posed by the latter situation arises when a craft is "waved off" or required to discontinue a landing almost accomplished and "go around" to another attempt at landing. When this situation arises full manual control of the attitude of the craft should be instantly available to the human pilot, and the engines should be adjusted to maximum power output. For quick establishment of these conditions in so complicated an apparatus, a special go-around switch and relay are provided.

It is at once apparent that with so large a number of condition responsive and control members, and so large a number of possible control combinations, there is considerable likelihood of hazardous or undesirable control combinations. For example, operation of the power stabilizing apparatus is erratic if the pitch attitude of the craft is not stabilized, and operation of the attack angle control apparatus simultaneous with manual elevator operation by the control stick is an excellent illustration of crossed control leading to a hazardous situation. Supervisory and interlock circuitry therefore is also included in the inventive system.

The above descriptions of various components of the apparatus are made with reference to the specific disclosure in the drawing for the purpose of enabling a clearer understanding of the following objects of the invention, and are not to be construed as limiting definitions of terminology used more broadly in the appended claims.

Objects of the invention

It is a principal object of the present invention to provide improved aircraft control apparatus in which the attitude and power settings of the craft may be automatically controlled in accordance with a number of variable quantities, and in which control may be transferred between certain of the variable quantities, the apparatus including particular interlocking means for preventing automatic performance of any control function in a hazardous way or out of its appropriate sequence.

Alternatively stated, the general object of the invention is to provide an arrangement for aircraft control apparatus which will make possible operation of the various manual and automatic controls therein comprised in any desired safe fashion, but which will prevent either automatic or heedless manual control under actually or potentially hazardous conditions.

A specific object of the invention is to provide a control arrangement, for an aircraft having attitude and power stabilizing means, which makes it impossible to initiate operation of the power stabilizing means unless operation of the attitude stabilizing means is simultaneously initiated.

Another specific object of the invention is to provide an arrangement, for an aircraft having attitude and power stabilizing means and attack angle control means for modifying the latter, in which normal operation of the attack angle control means is impossible unless both stabilizing means are in at least partial operation.

Another object of the invention is to provide an arrangement as just described, in which modification of the power stabilizing means by the attack angle control means cannot be initiated when either a turn control or a control stick, included in the attitude stabilizing means, is displaced from a normal, ineffective position.

Another object of the invention is to provide an arrangement as described above, in which modification of the power stabilizing means by the attack angle control means cannot be initiated when a function selector, for a radio responsive control device operative to modify the attitude stabilizing and attack angle control means, is displaced from a normal ineffective position.

Yet another object of the invention is to provide an arrangement, as described above, in which no automatic stabilization or control can be initiated if the function selector or the turn control or the control stick is displaced from a normal ineffective position.

A further object of the invention is to provide a device, as described above, in which the attack angle control means is a self-centering arrangement, and in which modification of the power stabilizing means thereby is prevented until the arrangement is centered.

A further object of the invention is to provide means for preventing operation of a go-around relay in the above described apparatus unless the function selector is in its Glide position, and for enabling the relay when operated to perform functions normally performed by the function selector in its Off position.

A still further object of the invention is to provide means for preventing movement of the function selector in the above described apparatus into a Glide position unless an efficiency-approach relay is at that time or has previously been operated into the Approach position, while allowing the function selector to be moved out of the Glide position without necessarily returning the efficiency-approach relay to its Efficiency position.

Yet another object of the invention is to provide, in an arrangement as described above, means by which either the pitch attitude or the attack angle of the craft, or both, may be manually adjusted while the apparatus is in full operating condition, to accommodate to necessary changes in the flight of the craft, as it passes from cross country cruising for example to preparation for a landing.

Various other objects, advantages, and features of novelty which characterize the invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which there is illustrated and described a preferred embodiment of the invention.

Figure 1C:
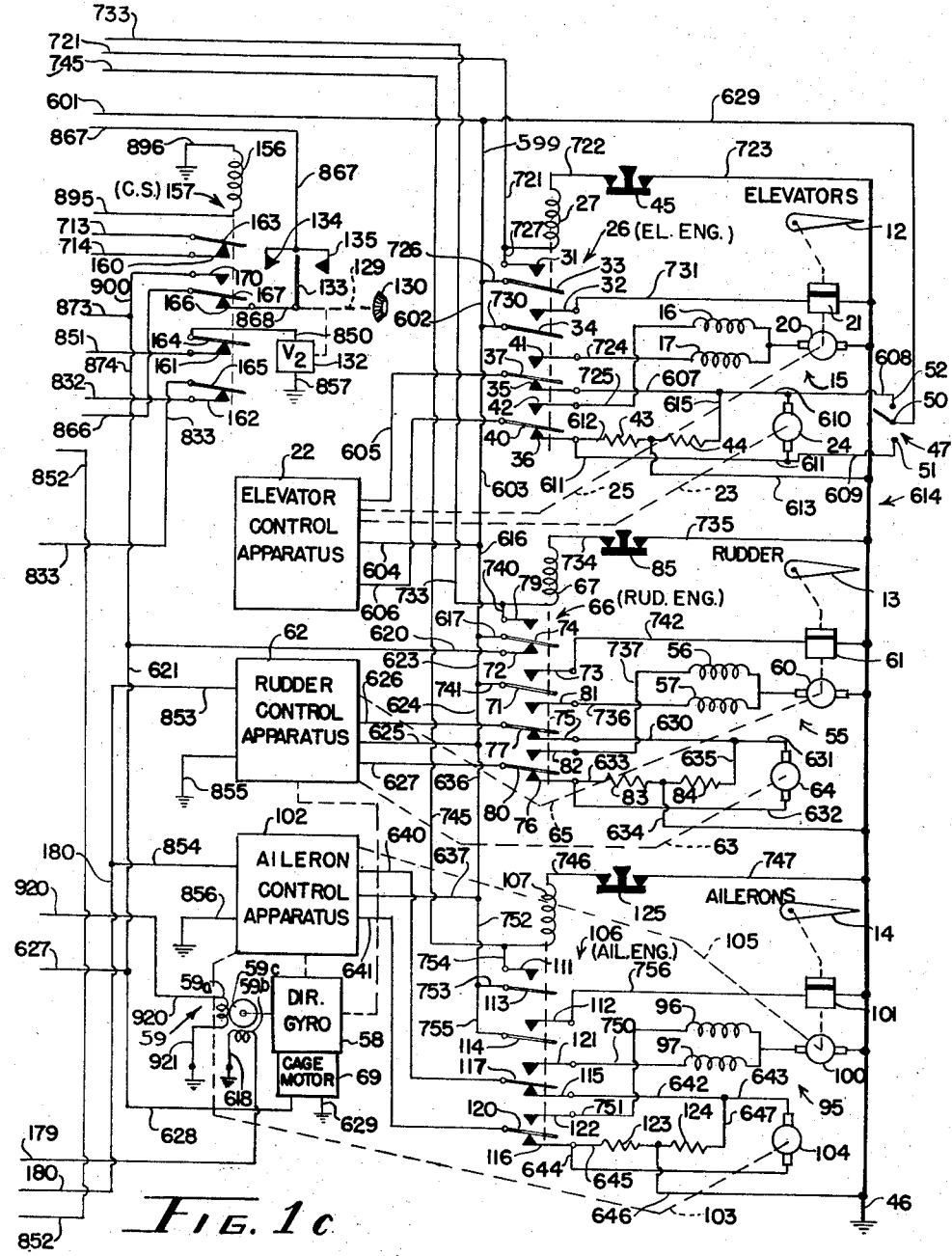

In the drawing Figures 1a, 1b, and 1c taken together are a diagrammatical showing of control apparatus according to the present invention.

Structure

As shown in the drawing, the apparatus is supplied with electrical energy from a source 10 of unidirectional voltage, which may comprise a connection to the battery of the aircraft, and a source 11 of alternating voltage, which may comprise a connection to an inverter energized from the battery. The negative terminal of source 10 and one terminal of source 11 are grounded.

The apparatus energized from sources 10 and 11 includes an automatic pilot or attitude stabilizing apparatus, shown in more detail in my copending application, Serial No. 206,579, entitled "Adjustable Apparatus for Attitude Stabilization of Aircraft," and an attack angle control apparatus, shown in more detail in my copending application Serial No. 206,578, entitled "Attack Angle Control for Powered Aircraft," now Patent 2,774,558. Both of these copending applications are filed concurrently herewith, and are assigned to the assignee of the present application.

Attitude control

The automatic pilot, largely shown in Figure 1c, includes servomotors for operating the elevators 12, rudder 13, and ailerons 14 of the craft. The elevator servomotor, identified by reference numeral 15, includes forward and reverse field windings 16 and 17 and a wound rotor 20, and drives elevators 12 through a mechanical connection including a normally disengaged, electrically engageable clutch 21. Motor 15 and clutch 21 are energized from elevator control apparatus, generally indicated by the rectangle 22, which may include members controlled by a vertical gyroscope and by such other control devices as may be desired, depending on the user's choice of an automatic pilot. One such further device may be a constant altitude control, such as is taught in the first of my copending applications previously referred to. Apparatus 22 is here indicated as including a control member driven through a mechanical connection 23 by a centering motor 24, which is shown to be of the permanent magnet type. Since it is desired that the control apparatus be of the rebalancing type rather than the floating type, a further control member is included in apparatus 22 and is driven through a mechanical connection 25 by servomotor 15.

Centering motor 24 is energized from apparatus 22 alternatively with servomotor 15, through an elevator engage relay 26 having a winding 27 which may be energized to displace moveable contacts 33, 34, 37, and 40 into engagement with fixed contacts 31, 32, 41, and 42 respectively: moveable contacts 37 and 40 are displaced out of normal engagement with fixed contacts 35 and 36. The direction of operation of servomotor 15 is determined by which of windings 16 and 17 is energized, and the direction of operation of centering motor 24 is determined by the manner of energization of a circuit including the motor and a pair of resistors 43 and 44 of equal resistance. A normally closed elevator disengage switch or button 45 is provided for individually deenergizing the elevator engage relay, by interrupting the circuit connecting winding 27 to ground connection 46.

A manual pitch attitude control switch 47 is shown to have a switching contact 50 moveable to engage either of two fixed contacts 51 and 52. In the normal condition of switch 47, switching contact 50 does not engage either of the fixed contacts, and the moveable contact is resiliently urged into this condition by suitable spring means.

The rudder servomotor, identified by reference numeral 55, includes forward and reverse field windings 56 and 57 and a wound rotor 60, and drives rudder 13 through a mechanical connection including a normally disengaged, electrically engageable clutch 61. Motor 55 and clutch 61 are energized from rudder control apparatus, generally indicated by the rectangle 62, which may include members controlled by a directional gyroscope 58, having a precessing motor 59 and a caging motor 69, and by such other control devices as may be desired, depending again on the user's choice of an automatic pilot. Apparatus 62 is here indicated as including a control member driven through a mechanical connection 63 by a centering motor 64 of the permanent magnet type, and a rebalacing member driven through a mechanical connection 65 by servomotor 55.

Precession motor 59 is preferably an A. C. motor having two stator windings spaced electrically by 90 degrees about the axis of a squirrel cage rotor, and energized in phase quadrature to cause operation of the rotor in one direction or the other, depending on which winding is energized in leading phase with respect to the other.

Caging motor 69 is a series wound D. C. motor which operates in one direction or the other depending on which of two stator windings is energized at the same time as the rotor winding. For simplicity of illustration only the caging function broadly is shown in Figure 1c.

Centering motor 64 is energized from apparatus 62 alternatively with servomotor 55, through a rudder engage relay 66 having a winding 67 which may be energized to displace moveable contacts 71, 74, 77, and 80 into engagement with fixed contacts 73, 79, 81, and 82 respectively: moveable contacts 74, 77, and 80 are displaced out of normal engagement with fixed contacts 72, 75, and 76. The direction of operation of servomotor 55 is determined by which of windings 56 and 57 is energized, and the direction of operation of centering motor 64 is determined by the manner of energization of a circuit including the motor and a pair of resistors 83 and 84 of equal resistance. A normally closed rudder disengage switch or button 85 is provided for individually deenergizing the rudder engage relay, by interrupting the circuit from winding 67 to ground connection 46.

The aileron servomotor, identified by reference numeral 95, includes forward and reverse field windings 96 and 97 and a wound rotor 100, and drives ailerons 14 through a mechanical connection including a normally disengaged, electrically engageable clutch 101. Motor 95 and clutch 101 are energized from aileron control apparatus, generally indicated by the rectangle 102, which may include members controlled by directional gyroscope 58 and by such other control devices as may be desired, depending once more on the user's choice of an automatic pilot. Apparatus 102 is here indicated as including a control member driven through a mechanical connection 103 by a centering motor 104 of the permanent magnet type, and a rebalancing member driven by a mechanical connection 105 from servomotor 95.

Centering motor 104 is energized from apparatus 102 alternatively with servomotor 95, through an aileron engage relay 106 having a winding 107 which may be energized to displace moveable contacts 113, 114, 117, and 120 into engagement with fixed contacts 111, 112, 121, and 122 respectively: moveable contacts 117 and 120 are displaced out of normal engagement with fixed contacts 115 and 116. The direction of operation of servomotor 95 is determined by which of windings 96 and 97 is energized, and the direction of operation of centering motor 104 is determined by the manner of energization of a circuit including the motor and a pair of resistors 123 and 124 of equal resistance. A normally closed aileron disengage switch or button 125 is provided for individually deenergizing the aileron engage relay, by interrupting the circuit connecting winding 107 to ground connection 46.

The automatic pilot further includes a manual turn control knob 130, and a control stick 131 shown in Figure 1b. The turn control knob is effective, through a mechanical connection 129 to suitable means indicated at 132, to vary a control voltage in sense and magnitude in accordance with the direction and amount of displacement of the knob from its central, inoperative position. At the same time the moveable contact 133 of a single-pole double-throw switch is moved from its normal ineffective position into engagement with one or the other of the fixed contacts 134 and 135. By means of this switch the turn control energizes the winding 136 of a turn control relay 137, Figure 1b, which displaces moveable contacts 143, 144, 145 and 147 out of normal engagement with fixed contacts 140, 141, 146, and 142 respectively, and moveable contact 147 is displaced into engagement with a fixed contact 150.

Control stick 131 is effective through suitable means indicated at 152 to vary a control voltage in sense and magnitude in accordance with the direction and amount of displacement of the stick from its central inoperative position. At the same time the moveable contact 153 of a single-pole double-throw switch is moved from its normal ineffective position into engagement with one or the other of the fixed contacts 154 and 155. By means of this switch the control stick energizes the winding 156 of a control stick relay 157, Figure 1c, which displaces moveable contacts 163, 164, 165, and 167 out of normal engagement with fixed contacts 160, 161, 162, and 166 respectively: moveable contact 167 is displaced into engagement with fixed contact 170.

Voltage adjusting means 152 and moveable contact 153 are actuated when control stick 131 is displaced from its central ineffective position, about a first axis, the sense and magnitude of the voltage supplied from means 152 being determined by the direction and amount of the displacement of the control stick. The stick is also adjustable about two other axes, to operate moveable contacts 171 and 172 into engagement with fixed contacts 173 or 174, and 175 or 176, respectively. In a complete automatic pilot, additional voltage adjusting means similar to 152 are normally provided about the remaining axes, but since the functions performed in the automatic pilot by these means have no bearing on the present invention, they have been omitted from the drawing. It should be pointed out that this type of simplification is employed elsewhere in this application to reduce the complexity of this application and to emphasize the actual invention here involved. The present application includes primarily the structure necessary to the present invention: further refinements may of course be made, according to known principles of automatic aircraft control, as desired. Also the craft will of course be provided with the customary control column and rudder pedals, for direct control by the human pilot if occasion demands.

*Radio response*

The heading of the craft must be capable of control in accordance with radio signals in order to cause the craft to make automatic descents along the landing paths created in space by the transmitters of the well known "instrument landing system." To this end there is provided a radio control unit 177 schematically illustrated in the drawing, which includes the localizer and glide path channels of the ILS receiver, and associated means for deriving, from the D. C. signals of these channels, proportional outputs of a suitable nature for use in automatic control of the craft and the attack angle stabilizing apparatus. One arrangement for obtaining suitable outputs is shown in the copending application of Ross C. Alderson and Benjamin Carpenter, Serial No. 49,442, filed September 15, 1948, and assigned to the assignee of the present application. The antennas for the localizer and glide path signals are indicated at 182 and 183.

The localizer output is to be applied to precessing motor 59 of directional gyroscope 58, through a conductor 179, and to rudder control apparatus 62 and aileron control apparatus 102, through a conductor 180: it must be of one of two opposite senses, as will presently be set forth. It is also desirable to reduce the control effect resulting from a given localizer signal when the craft is beginning the final glide. It is further desirable not to precess the directional gyroscope during initial stages of approach, that is, until the glide is being performed. Finally, it is desirable that the ILS equipment be turned on and allowed to reach an equilibrium condition before it is placed in control of the craft.

The localizer output is therefore caused to be transmitted through a "reverse" relay 185, an "output" relay 187, and a "localizer" relay 186. The reverse relay selects one of two opposite senses for the output, the output relay selects one of two different magnitudes for the output, and the localizer relay completes or interrupts the supply of the output to conductors 179 and 180.

In the deenergized condiiton of these relays, the output is cut off from conductors 179 and 180 by localizer relay 186, but is supplied to the relay in a normal phase and at the smaller of the two possible values. When relay 185 is energized the phase of the output is reversed; when relay 187 is energized, the larger of the two possible values of output is selected; and when relay 186 is energized an output determined by the condition of relays 185 and 187 is supplied on conductors 179 and 180.

The glide path output is applied to an attack angle network 151, Figure 1a, through a conductor 181, under the control of a "glide" relay 184. In the deenergized condition of relay 184 the supply of this output to the network is interrupted.

Control of relays 184, 185, 186, and 187 in a proper sequence must be exerted if successful automatic landings are to be accomplished, and this control is the principal function of a function selector indicated by the general reference numeral 188. Full mechanical details of this device are given in copending application 230,055 of G. A. Kwasniewski, filed June 5, 1951, and assigned to the assignee of the present application. This application has now matured into Patent 2,639,338. A manual knob 189 is effective through a mechanical connection 190 to move an index 191 with respect to a set of graduations 192 indicating the radio control function being performed in each of the several positions of the index, and to move a number of switch arms 193, 194, 195, 196, and 197 with respect to the following sets of fixed contacts, respectively: 200, 201, 202, and 203; 204, 205, 206, and 207; 210, 211, 212, and 213; 214, 215, 216, and 217; and 220, 221, 222, and 223.

A subordinate function performed by function selector 188 is control of the line phase energization of precessing motor 59 of directional gyroscope 58. For performing this function there is provided a precession control relay 225 having a winding 226 which operates a normally open single pole single throw switch, made up of a fixed contact 227 and a movable contact 230, and a normally closed single pole single throw switch, made up of a fixed contact 231 and a moveable contact 232. An auxiliary gyro switch or button 233 is also provided in the precession motor control portion of the apparatus. Gyro switch 233 is basically a normally open single pole single throw momentary contact switch, and is mechanically connected for operation by function selector 188.

The selector has Out, Off, In, and Glide positions, reading clockwise: in the Glide position of the function selector, switch 233 is automatically closed and cannot be opened manually, and in the Off position of the function selector, switch 233 is automatically opened and cannot be closed manually. In the In and Out positions of the function selector, switch 233 can if desired be manually operated into its closed position, where it is mechanically held until the function selector is moved to its Off position.

Another subordinate function performed by function selector 188 is control of a single pole single throw efficiency-approach switch 234. In the Out, Off, and In positions of the function selector, switch 234 is manually operable into either its open or its closed position. In the Glide poistion of the function selector, switch 234 is automatically closed and cannot be opened manually. The purpose of this arrangement will be clear when the power stabilizing apparatus is described.

The automatic pilot is put into operation by manual closure of a normally open single pole single throw momentary contact master engage switch or button 235. This energizes the winding 236 of a master engage relay 237 which displaces moveable contacts 245, 246, 247, 250, and 251 into engagement with fixed contacts 240, 241, 242, 243, and 244 respectively.

In a lower central portion of the drawing is shown a go-around relay 260 which functions both in the automatic pilot and in the power stabilizing apparatus. Because of the large number of contacts required, this relay is shown as two switching units connected for simultaneous operation. A first winding 261 may be energized to displace moveable contacts 264, 265, 270, and 271 into engagement with fixed contacts 262, 263, 272, and 273 respectively: moveable contacts 270 and 271 are displaced out of normal engagement with fixed contacts 266 and 267. A second winding 274 may be energized to displace moveable contacts 281 and 282 out of normal engagement with fixed contacts 277 and 280, and into engagement with fixed contacts 283 and 284, respectively. A normally open single pole single throw momentary contact go-around switch or button 285, and a go-around indicator lamp 286 are associated with relay 260.

*Power control*

The power stabilizing apparatus which will now be considered has two principal components, that for the absolute intake manifold pressure and that for the engine R. P. M. In the center of the drawing are shown the left and right R. P. M. levers, 310 and 311, which control the governors of the left and right propellers through conventional linkages, not shown. Levers 310 and 311 are driven, under the control of suitable R. P. M. control apparatus indicated at 312, by left and right R. P. M. motors 313 and 314 respectively.

The R. P. M. control apparatus may be of any suitable type, which may include suitable R. P. M. sensing devices, and, since proportioning control is desired, may also include control devices adjusted in accordance with the positions of levers 310, 311, by mechanical connections 315 and 316.

Motor 313 comprises a line phase winding 317, with which is associated a quadrature capacitor 322, an amplifier phase winding 320, and a rotor 321. Rotor 321 is carried on a shaft 323 which drives lever 310 through a normally disengaged, electrically engageable clutch 324. Shaft 323 also carries the rotor 325 of a velocity generator 326 having a secondary winding 327 and a primary winding 330 with which is associated a phasing capacitor 331. When rotor 325 is rotated by motor 313, a voltage of the frequency of source 11 is induced in secondary winding 327, the amplitude and phase of this voltage being determined by the speed and direction of the rotation of the rotor.

Motor 314 comprises a line phase winding 337, with which is associated a quadrature capacitor 342, an amplifier phase winding 340, and a rotor 341. Rotor 341 is carried on a shaft 343, which drives lever 311 through a normally disengaged, electrically engageable clutch 344. Shaft 343 also carries the rotor 345 of a velocity generator 346 similar to generator 326 and having a secondary winding 347 and a primary winding 350 with which is associated a phasing capacitor 351.

To the left of the R. P. M. control levers are shown the left and right MAP levers, 360 and 361 (Figure 1a), which control the throttles of the left and right engines through the conventional linkages not shown. Levers 360 and and 361 are driven, under the control of suitable MAP control apparatus indicated at 362, by left and right MAP motors 363 and 364 respectively.

The MAP control apparatus will also be of any suitable type, which may include suitable MAP sensing devices, and includes control devices adjusted in accordance with the positions of the levers 360 and 361 by mechanical connections 365 and 366.

Motor 363 comprises a line phase winding 367 with which is associated a quadrature capacitor 372, an amplifier phase winding 370 and a rotor 371. Rotor 371 is carried on a shaft 373 which drives lever 360 through a normally disengaged, electrically engageable clutch 374. Shaft 373 also carries the rotor 375 of a velocity generator 376 similar to generator 326 and having a secondary winding 377 and a primary winding 380 with which is associated a phasing capacitor 381.

Motor 364 comprises a line phase winding 387 with which is associated a quadrature capacitor 392, an amplifier phase winding 390, and a rotor 391. Rotor 391 is carried by a shaft 393 which drives the lever 361 through a normally disengaged, electrically engageable clutch 394. Shaft 393 also carries the rotor 395 of a velocity generator 396 similar to generator 326 and having a secondary winding 397 and a primary winding 400 with which is associated a phasing capacitor 401.

The power stabilizing apparatus is controlled by a pair of relays shown in the upper left portion of the drawing. Left power engage relay 410 is seen to comprise a winding 411 which may be energized to displace moveable contacts 415, 416, and 417 into engagement with fixed contacts 412, 413, and 414, respectively, and to displace moveable contact 421 out of normal engagement with fixed contact 420.

Right power engage relay 422 is seen to comprise a winding 423 which may be energized to displace moveable contacts 427, 430, and 431 into engagement with fixed contacts 424, 425, and 426, respectively, and to displace moveable contact 433 out of normal engagement with contact 432.

With relays 410 and 422 are associated three normally closed switches or buttons 434, 435, and 437, which are identified as the left, right, and master power disengage buttons.

Means are further provided for supplying alternating voltages to the R. P. M. and MAP control apparatus under manual control, so that the values of R. P. M. and MAP at which the apparatus is stabilized may be adjusted. To this end there is provided a transformer 440 having a primary winding 441, a first secondary winding 442, a second secondary winding 443 having a terminal 444 and intermediate taps 445 and 446, and a third secondary winding 451 having a terminal 452 and intermediate taps 453, 454, and 455.

The winding 460 of a voltage divider 461, having a slider 462, is connected across secondary winding 442, and the winding 463 of a voltage divider 464, having a slider 465, is connected between one terminal of winding 460 and slider 462.

The winding 466 of a voltage divider 467, having a slider 470, is connected between terminal 444 of secondary winding 443 and intermediate tap 445, and the windings 471 and 472 of further voltage dividers 473 and 474, having sliders 475 and 476, are connected between terminal 444 and tap 446.

The windings 480 and 481 of voltage dividers 482 and 483, having sliders 484 and 485, are connected between terminal 452 and intermediate tap 453 of secondary winding 451, and the winding 486 of a voltage divider 487, having a slider 490, is connected between the terminal 452 and tap 454. A portion of winding 481 is metallized as indicated at 491, and windings 471, 472, 481, and 486 have the same range of travel for their respective sliders 475, 476, 485, and 490, which are simultaneously actuated by a mechanical connection 492 to a manual power control lever 493. Sliders 465, 470, and 484 are individually settable. Slider 462 is adjusted by a mechanical connection 494 to an altitude responsive device indicated by a bellows 495.

An efficiency-approach relay 496 cooperates with relay 260 to determine what voltages from transformer 440 are supplied to R. P. M. control apparatus 312 and MAP control apparatus 362. Relay 496 comprises a winding 497 which may be energized to displace moveable contacts 502 and 503 out of normal engagement with fixed contacts 500 and 501 and into engagement with fixed contacts 504 and 505 respectively.

*Attack angle control*

The attack angle control apparatus comprises a control network 151 shown at the lower left portion of Figure 1a. This network may conveniently comprise a self-centering arrangement having a "centering" condition and a "controlling" condition. In the centering condition of network 151 a motor 511 drives a first control member, through a mechanical connection 512, into agreement with the position of a second control member positioned by an attack angle responsive vane 513 through a second mechanical connection 514. In the controlling condition of network 151 there is provided at terminals 515 and 516 an output which is determined in magnitude and sense by the relation between the position of the first control member, which is fixed because motor 511 is not operating, and the position taken by the second control member in response to movement of vane 513.

The output from network 151 is supplied to MAP control apparatus 362, and also to a servo amplifier 509 for controlling motor 511 through an attack angle engage relay 520 having a winding 521 which may be energized to displace moveable contacts 530 and 531 out of normal engagement with fixed contacts 526 and 527, and to displace moveable contacts 524 and 525 into engagement with normally closed double pole single fixed contacts 522 and 523, respectively.

Associated with relay 520 are a normally closed attack angle disengage switch or button 532, a normally open single pole single throw momentary contact attack angle engage switch or button 533, and an attack angle indicator lamp 534. The direction of operation of motor 511 is determined by the manner of energization of a circuit including the motor, a pair of resistors 535 and 536 of equal resistance, and the winding 540 of an attack angle anti-engage relay 541, which may be energized to displace a moveable contact 543 out of normal engagement with a fixed contact 542.

A manual attack angle control switch 557 is shown to have a switching contact 560 moveable to engage either of two fixed contacts 561 and 562. In the normal condition of switch 557 switching contact 560 does not engage either of the fixed contacts, and the moveable contact is resiliently urged into this normal condition by suitable spring means.

The apparatus includes a lock-out relay 544 whose winding 545 may be energized to displace moveable contact 547 out of normal engagement with fixed contact 546.

In one embodiment of the invention the following values were found to give satisfactory operation.

Source 10_____ 28 volts D. C.
Source 11_____ 115 volts, 400 cycles single phase A. C.
All fixed resistors_____ 20 ohms.
All capacitors_____ .12 microfarad.
Sources 132 and 152____ 15 volts D. C.
Winding 460_____ 640 ohms.
Winding 463_____ 1000 ohms.
Windings 466 and 480__ 500 ohms.
Winding 471_____ 79.8 ohms characterized.
Winding 472_____ 731 ohms characterized.
Winding 481_____ 209 ohms characterized.
Winding 486_____ 126 ohms characterized.
Secondary winding 442_. 3.8 volts A. C.
Tap 445 to terminal 444_ 22 volts A. C.
Tap 445 to tap 446_____ 18 volts A. C. opposite phase.
Tap 455 to terminal 452_ 25.6 volts A. C.
Tap 455 to tap 453_____ 15.4 volts A. C. same phase.
Tap 455 to tap 454_____ 8.55 volts A. C. same phase.

The various components of the system having been identified, their interrelation and functioning can now be described, the electrical wiring which interconnects them being traced at the same time.

Operation

The various relays and switches are shown in the drawing in the positions they assume when the apparatus is entirely deenergized. Under these circumstances control of the elevators and ailerons is exercised by the control column, control of the rudder by the rudder pedals, and control of the throttles and propeller governors by the throttle and R. P. M. levers, each pair of which will normally be set at the same position along their range of travel. It is assumed for the purpose of discussion that efficiency-approach switch 234 is in its efficiency or open position, and that function selector 188 is set at Off. The directional gyroscope and any other gyroscopes in the apparatus are assumed to have been brought up to speed, and the various amplifiers comprised in the apparatus are assumed to have been brought to a stable operating temperature.

Standby conditions

When it is desired to change from manual to automatic flight, sources 10 and 11 are energized in any desired fashion. A complete circuit may now be traced from the positive terminal of source 10 through conductors 600, 601, 599, 602, 603, and 604 to elevator control apparatus 22. The function of this apparatus is to connect conductor 604 either to a first conductor 605 or to a second conductor 606, according as the need is present for displacing the elevators in one direction or another. The craft has been brought by the human pilot into a desired pitch attitude, so that in fact there is no need for adjustment of the elevators: if this attitude is to be maintained when control is made automatic, the elevator control apparatus must first be adjusted to a "balance" condition in which it connects conductor 604 to neither one of conductors 605 and 606. This is done by the member driven by motor 24, which motor can be energized through either one of two circuits.

The first circuit, effective when conductor 605 is connected to conductor 604, may be traced from conductor 605 through moveable contact 37, fixed contact 35, conductors 607 and 610, motor 24, conductors 611 and 612, resistor 43, and conductor 613 to ground bus 614. In this circuit the upper brush of motor 24 is positive with respect to the lower, and motor 24 rotates in a "forward" direction to adjust apparatus 22 in a first sense, until conductors 604 and 605 are disconnected.

The second circuit, effective when conductor 606 is connected to conductor 604, may be traced from conductor 606 through moveable contact 40, fixed contact 36, conductor 611, motor 24, conductors 610 and 615, resistor 44, and conductor 613 to ground bus 614. In this circuit the upper brush of motor 24 is negative with respect to the lower brush, and motor 24 rotates in a "reverse" direction to adjust apparatus 22 in the sense opposite to that described in the previous paragraph, until conductors 604 and 606 are disconnected.

When motor 24 has adjusted its control member so that conductor 604 is disconnected from both conductor 605 and conductor 606, elevator control apparatus 22 is balanced and ready to be placed in control of elevators 12. This condition may be made known to the human pilot by any suitable indicating means not shown.

The circuit from the positive terminal of the source 10 may be traced further from conductor 603 through conductors 616 and 617, moveable contact 74, fixed contact 72, conductors 620, 621, 627, and 622, to the Output relay 187 of radio control unit 177, the circuit being completed through ground connection 619. Relay 187 is operated to select the larger magnitude of output in the localizer channel of the unit. Any localizer channel output is cut off, however, because localizer relay 186 is not energized, so no change in the automatic pilot is brought about by this means.

The circuit from the positive terminal of source 10 may be traced further from conductor 621 through conductor 628 to caging motor 69 of directional gyroscope 58, the circuit being completed through ground connection 629. Whenever this circuit is energized the directional gyroscope is caged, so that change in the heading of the craft has no effect on the control action of the gyroscope. When the caging motor circuit is deenergized, the gyroscope is uncaged and thereafter responds to change in the heading of the craft.

The circuit from the positive terminal of source 10 may be further traced from conductor 616 through conductors 623, 624, and 625 to rudder control apparatus 62. This apparatus is similar to elevator control apparatus 22, and is effective when unbalanced to energize motor 64 either for forward rotation, through a circuit including conductor 626, moveable contact 77, fixed contact 75, conductors 630 and 631, motor 64, conductors 632 and 633, resistor 83, conductor 634 and ground bus 614, or for reverse rotation through a circuit including conductor 627, moveable contact 80, fixed contact 76, conductor 632, motor 64, conductors 631 and 635, resistor 84, conductor 634 and ground bus 614. The rudder control apparatus 62 is thus prepared to be placed in control of rudder 13.

The circuit from the positive terminal of source 10 may be further traced from conductor 624 through conductors 636 and 637 to aileron control apparatus 102. This apparatus is also similar to elevator control apparatus 22, and is effective when unbalanced to energize motor 104 either for forward rotation, through a circuit including conductor 640, moveable contact 117, fixed contact 115, conductors 642 and 643, motor 104, conductors 644 and 645, resistor 123, conductor 646, and ground bus 614, or for reverse rotation, through a circuit including conductor 641, moveable contact 120, fixed contact 116, conductor 644, motor 104, conductors 643 and 647, resistor 124, conductor 646, and ground bus 614. Aileron control apparatus 102 is thus prepared to be placed in control of aileron 14.

A further circuit may be traced from the positive terminal of source 10 through conductors 600, 650, 651, 652, 653, and 654, fixed contact 420, moveable contact 421, conductor 655, moveable contact 433, fixed contact 432, and conductors 656 and 657 to the winding 545 of lockout relay 544, and thence through conductor 660 to ground connection 661. The relay is operated, opening the connection between fixed contact 546 and moveable contact 547. No circuit is presently energized through these contacts, however, so no change in the operation of the craft takes place.

A circuit may be traced from the ungrounded terminal of A. C. source 11 through conductors 662, 663, and 664 to energize the R. P. M. control apparatus 312, the circuit being completed through ground connection 665. From conductor 663 the circuit may be further traced through conductors 666 and 667 to energize MAP control apparatus 362, the circuit being completed through ground connection 670. From conductor 666 the circuit may be further traced through conductor 671, 672, and 673 to energize attack angle network 151, the circuit being completed through ground connection 674. From conductor 672 the circuit may be traced through conductor 675 to primary winding 441 of transformer 440, the circuit being completed through ground connection 676. Energization of primary winding 441 induces voltages in secondary windings 442, 443, and 451, which determine the voltages at fixed contacts of relays 260 and 496, as follows.

A circuit may be traced from fixed contact 283 of relay 260 through conductor 680, slider 470, the portion of winding 466 to the right of the slider, conductors 681 and 682, slider 465, and the portion of winding 463 to the left of the slider to ground connection 683. The voltage to ground at fixed contact 283 is hence the sum of that determined by slider 470 and a portion of that determined by slider 462, the magnitude of the portion being determined by the setting of slider 465 which ordinarily remains in a preset adjustment. This voltage is the "go-around" MAP control voltage.

A circuit may be traced from fixed contact 284 of relay 260 through conductor 684, slider 484, the portion of winding 480 to the right of the slider, conductor 685, intermediate tap 453, a portion of winding 451, and tap 455 to ground connection 686. The voltage to ground at fixed contact 284 is hence the sum of that determined by slider 484 and that between taps 453 and 455. This voltage is the "go-around" R. P. M. control voltage.

A circuit may be traced from fixed contact 500 of relay 496 through conductor 690, slider 476, the portion of winding 472 to the right of the slider, conductors 688 and 689, tap 446, a portion of secondary winding 443, tap 445, conductors 687 and 682, slider 465, and the portion of winding 463 to the left of the slider to ground connection 683. The voltage to ground at fixed contact 500 is hence the sum of that determined by slider 476 and the preset portion of that determined by slider 462: this is the "efficiency" MAP control voltage.

A circuit may be traced from fixed contact 504 of relay 496 through conductor 692, slider 475, the portion of winding 471 to the right of the slider, conductor 689, tap 446, a portion of secondary winding 443, tap 445, conductors 687 and 682, slider 465 and the portion of winding 463 to the left of the slider to ground connection 683. The voltage to ground at fixed contact 504 is the sum of that determined by slider 475 and the preset portion of that determined by slider 462: this is the "approach" MAP control voltage.

A circuit may be traced from fixed contact 501 through conductor 693, slider 490, the portion of winding 486 to the right of the slider, conductor 694, tap 454, a portion of secondary winding 451, and tap 455 to ground connection 686. The voltage to ground at fixed contact 501 is hence the sum of that determined by slider 490 and that between taps 454 and 455: this voltage is the "efficiency" R. P. M. control voltage.

A circuit may be traced from fixed contact 505 through conductor 696, slider 485, the portion of winding 481 to the right of the slider, conductors 697 and 685, tap 453, a portion of secondary winding 451, and tap 455 to ground connection 686. The voltage to ground at fixed contact 505 is hence the sum of that determined by slider 485 and that between taps 453 and 455: this voltage is the "approach" R. P. M. control voltage.

Under the manual control conditions specified above, the R. P. M. control apparatus is supplied with the voltage appearing at fixed contact 501, through a circuit including moveable contact 503, conductor 700, fixed contact 280, moveable contact 282, and conductor 701, the circuit to the transformer being completed through ground connection 665. This voltage is effective in apparatus 312, in combination with such other voltages as may be determined by operation of mechanical connections 315 and 316 or otherwise, to control the energization of the amplifier phase windings 320 and 340 of motors 313 and 314. Line phase windings 317 and 337 are not energized, however, and no operation of motors 313 and 314 takes place. The presence of voltage on windings 320 and 340 may be detected by any suitable means, however, and slider 490 may be adjusted by manual lever 493 until this voltage disappears. When this condition is brought about, the R. P. M. control apparatus is ready to be placed in control of R. P. M. levers 310 and 311.

Under the same conditions, the MAP control apparatus is supplied with the voltage appearing at fixed contact 500, through a circuit which includes moveable contact 502, conductor 702, fixed contact 277, moveable contact 281, and conductor 703, the circuit being completed through ground connection 670. This voltage is effective in apparatus 362, in combination with such other voltages as may be determined by operation of mechanical connections 365 and 366, from network 151, or otherwise, to control the energization of the amplifier phase windings 370 and 390 of motors 363 and 364. Line phase windings 367 and 387 are not energized, however, and no operation of motors 363 and 364 takes place. The presence of voltage on windings 370 and 390 may be detected by any suitable means, however, and slider 476 may be adjusted by manual lever 493 until this voltage disappears. When this condition is brought about, the MAP control apparatus is ready to be placed in control of the throttle.

Suitable adjusting means may be provided in apparatus 312 and apparatus 362, if necessary, to insure that the amplifier phase windings of both motors 313 and 314 and motors 363 and 364 may be deenergized at the same time by operation of lever 493 to a single operated position.

*Attitude and power stabilization*

The human pilot may now press momentarily upon engage button 235. This completes a circuit from the positive terminal of source 10 through conductors 600, 650, 651, 710, 711, and 712, moveable contact 193, fixed contact 201, conductor 713, moveable contact 163, fixed contact 160, conductor 714, moveable contact 144, fixed contact 141, conductor 715, engage button 235, and conductor 716 to winding 236 of master engage relay 237, the circuit being completed by ground connection 717. This circuit remains completed only so long as button 235 remains operated, and since relay 237 has no holding circuit, its operation is interrupted as soon as button 235 is released.

Master engage relay 237 now operates, completing five circuits, three of them in the automatic pilot and two of them in the power stabilizing apparatus. The first of these circuits may be traced from the positive terminal of source 10 through conductors 600, 650, and 720, moveable contact 245, fixed contact 240, and conductor 721 to winding 27 of elevator engage relay 26, and thence through conductor 722, elevator disengage button 45, and conductor 723 to ground bus 614.

Thus energized, elevator engage relay 26 operates, connecting servomotor 15 to elevator control apparatus 22 through circuits which may be traced from conductor 605 through moveable contact 37, fixed contact 41, conductor 724, and winding 17 and rotor 20 of the motor to ground bus 614, and from conductor 606 through moveable contact 40, fixed contact 42, conductor 725, and winding 16 and rotor 20 of the motor to ground bus 614. Since at this time the elevator control apparatus is balanced, operation of servomotor 15 does not result until some departure of the craft from its then pitch attitude takes place. Centering motor 24 is disconnected from elevator control apparatus 22 by the same operation of moveable contacts 37 and 40 that connect servomotor 15 thereto. In practice an electrically releasable brake is provided in servomotor 15 to hold the rotor stationary except when one of windings 16 and 17 is energized. The same is true of motors 55 and 95.

Operation of elevator engage relay 26 completes two further circuits. The first is a holding circuit which retains the relay in operated position after relay 237 is released. This holding circuit may be traced from the positive terminal of source 10 through conductors 600, 601, 599, and 726, moveable contact 33, fixed contact 31, conductor 727, winding 27, conductor 722, elevator disengage button 45, conductor 723 and ground bus 614.

The second further circuit completed by operation of elevator engage relay 26 is that energizing clutch 21. This circuit may be traced from the positive terminal of source 10 through conductors 600, 601, 599, 602, and 730, moveable contact 34, fixed contact 32, conductor 731, clutch 21, and ground bus 614. Servomotor 15 is thereby mechanically connected to elevators 12, for causing their operation in accordance with signals from the elevator control apparatus.

The second of the circuits completed upon operation of master engage relay 237 may be traced from the positive terminal of source 10 through conductors 600, 650, 720, and 732, moveable contact 246, fixed contact 241, and conductor 733 to winding 67 of rudder engage relay 66, and thence through conductor 734, rudder disengage button 85 and conductor 735 to ground bus 614.

Thus energized, rudder engage relay 66 operates, connecting servomotor 55 to rudder control apparatus 62 through circuits which may be traced from conductor 626 through moveable contact 77, fixed contact 81, conductor 736, and winding 57 and rotor 60 of the motor to ground bus 614, and from conductor 627 to moveable contact 80, fixed contact 82, conductor 737, and winding 56 and rotor 60 of the motor to ground bus 614. Since at this time the rudder control apparatus is balanced, operation of servomotor 55 does not result until some departure of the craft from its then yaw attitude takes place. Centering motor 64 is disconnected from rudder control apparatus 62 by the same operation of moveable contacts 77 and 80 that connects servomotor 55 thereto.

Operation of rudder engage relay 66 completes two further circuits. The first is a holding circuit which retains the relay in operated position after relay 237 is released. This holding circuit may be traced from the positive terminal of source 10 through conductors 600, 601, 599, 602, 603, 616, and 617, moveable contact 74, fixed contact 79, conductor 740, winding 67, conductor 734, rudder disengage button 85, conductor 735, and ground bus 614. Output relay 187 in radio control unit 177 and caging motor 69 of directional gyroscope 58 are deenergized at fixed contact 72 by the same operation of moveable contact 74 that energizes the holding circuit.

The second further circuit complete by operation of rudder engage relay 66 is that energizing clutch 61. This circuit may be traced from the positive terminal of the source 10 through conductors 600, 601, 599, 602, 603, 616, 623, and 741, moveable contact 71, fixed contact 73, conductor 742, clutch 61, and ground bus 614. Servomotor 55 is thereby mechanically connected to rudder 13, for causing its operation in accordance with signals from the rudder control apparatus.

The third of the circuits completed by operation of master engage relay 237 may be traced from the positive terminal of source 10 through conductors 600, 650, 720, 732, and 743, moveable contact 247, fixed contact 242, and conductors 744 and 745 to winding 107 of aileron engage relay 106, and hence through conductor 746, disengage button 125, and conductor 747 to ground bus 614.

Thus energized, aileron engage relay 106 operates, connecting servomotor 95 to aileron control apparatus 102 through circuits which may be traced from conductor 640 through moveable contact 117, fixed contact 121, conductor 750, and winding 97 and rotor 100 of the servomotor to ground bus 614, and from conductor 641 to moveable contact 120, fixed contact 122, conductor 751, and winding 96 and rotor 100 of the motor to ground bus 614. Since at this time the aileron control apparatus is balanced, operation of servomotor 95 does not result until some departure of the craft from its then roll attitude takes place. Centering motor 104 is disconnected from aileron control apparatus 102 by the same operation of movable contacts 117 and 120 that connects servomotor 95 thereto.

Operation of aileron engage relay 106 completes two further circuits. The first is a holding circuit which retains the relay in operated position after relay 237 is released. This holding circuit may be traced from the positive terminal of source 10 through conductors 600, 601, 599, 602, 603, 616, 623, 624, 636, 752, and 753, moveable contact 113, fixed contact 111, conductor 754, winding 107, conductor 746, aileron disengage button 125, and conductor 747 to ground bus 614.

The second further circuit completed by operation of aileron engage relay 106 is that energizing clutch 101. This circuit may be traced from the positive terminal of source 10 through conductors 600, 601, 599, 602, 603, 616, 623, 624, 636, 752 and 755, movable contact 114, fixed contact 112, conductor 756, clutch 101, and ground bus 614. Servomotor 95 is thereby mechanically connected to ailerons 14 for causing their operation in accordance with signals from the aileron control apparatus.

The fourth of the circuits completed by operation of master engage relay 237 may be traced from the positive terminal of source 10 through conductors 600, 650, 720, 732, 743, and 757, movable contact 250, fixed contact 243, conductor 760, winding 423 of the right power control relay 422, conductor 761, right power disengage button 435, conductors 762 and 763, and master power disengage button 437 to ground connection 764.

The right power control relay 422 accordingly operates, energizing a first motor bus 765 through a circuit which may be traced from the ungrounded terminal of source 11 through conductors 662, 663, 666, 671, 766, and 767, fixed contact 425, and moveable contact 430. Line phase winding 387 of motor 364 and primary winding 400 of velocity generator 396 are energized from bus 765, through conductor 770, and line phase winding 337 of motor 314 and primary winding 350 of velocity generator 346 are energized from bus 765 through conductor 771.

The right power control relay 422 also energizes a first clutch bus 772 through a circuit which may be traced from the positive terminal of source 10 through conductors 600, 650, 651, 652, 653, 773, 774, and 775, movable contact 431 and fixed contact 426. Clutch 394 is energized from bus 772 through conductor 776 and ground conduction 777: clutch 344 is energized from bus 772 through conductor 780 and ground connection 781.

The right power control relay 422 also completes its own holding circuit which may be traced from the positive terminal of source 10 through conductors 600, 650, 651, 652, 782, and 783, moveable contact 427, fixed contact 424, conductor 784, winding 423, conductor 761, right power disengage button 435, conductors 762 and 763, and master power disengage button 437 to ground connection 764.

The right power control relay 422 also interrupts the circuit to winding 545 of lockout relay 544 at contacts 432 and 433, so that the lockout relay is deenergized and contacts 546 and 547 again make connection.

The fifth of the circuits completed by operation of master engage relay 237 may be traced from the positive terminal of source 10 through conductors 600, 650, 720, 732, 743, 757, and 785, movable contact 251, fixed contact 244, conductor 786, winding 411 of the left power control relay 410, left power disengage button 434, conductors 787 and 763, and master power disengage button 437 to ground connection 764.

The left power control relay 410 accordingly operates, energizing a second motor bus 790 through a circuit which may be traced from the ungrounded terminal of source 11 through conductors 662, 663, 666, 671, 766, and 791, fixed contact 413, and moveable contact 416. Line phase winding 367 of motor 363 and primary winding 380 of velocity generator 376 are energized from bus 790 through conductor 792, and line phase winding 317 of motor 313 and primary winding 330 of velocity generator 326 are energized from bus 790 through conductor 793.

The left power control relay 410 also energizes a second clutch bus 794 through a circuit which may be traced from the positive terminal of source 10 through conductors 600, 650, 651, 652, 653, 773, and 774, movable contact 417, and fixed contact 414. Clutch 374 is energized from bus 794 through conductor 795 and ground connection 796: clutch 324 is energized from bus 794 through conductor 797 and ground connection 798.

The left power control relay 410 also completes its own holding circuit which may be traced from the positive terminal of source 10 through conductors 600, 650, 651, 652, and 782, movable contact 415, fixed contact 412, conductor 799, winding 411, left power disengage button 434, conductors 787 and 763, and master power disengage button 437 to ground connection 764.

The left power control relay 410 also interrupts the circuit to winding 545 of lockout 544 at contacts 420 and 421, so that the relay is deenergized and contacts 546 and 547 again make connection.

Attack angle network 151 is of the type wherein alternating voltage of the frequency of source 11, applied thereto through the circuit previously traced, appears at output conductors 820 and 821 in one of two opposite phases, and in variable amplitude, according to the sense and amount of any disagreement between the members driven by vane 513 and motor 511.

Servo amplifier 509 is controlled by the output voltage from network 151, which is applied to servo amplifier 509 through conductors 822 and 823. Amplifier 509 is of the type in which alternating voltage of a first phase applied at conductors 822 and 823 causes conductor 808 to be connected to conductor 805, while alternating voltage of the opposite phase applied to conductors 822 and 823 causes conductor 808 to be connected to conductor 806. In the absence of voltage on conductors 822 and 823, conductor 808 is disconnected from both conductor 805 and conductor 806.

A further circuit can be traced from the positive terminal of source 10 through conductors 600, 650, 651, 652, 653, 773, 804, and 808 to servo amplifier 509, which functions to connect conductor 808 to conductor 805 or conductor 806 in accordance with the sense of any voltage impressed on the amplifier.

Conductor 805 energizes motor 511 through a circuit which may be traced through moveable contact 530, fixed contact 526, conductors 807 and 810, motor 511, conductor 811, resistor 536, conductor 812, winding 540 of attack angle anti-engage relay 541, conductor 813, and ground connection 661. Under these conditions the upper brush of motor 511 is positive with respect to the lower brush, causing "forward" operation of the motor, and the motor current energizes relay 541, interrupting the circuit between contacts 543 and 542.

Conductor 806 energizes motor 511 through a circuit which may be traced through moveable contact 531, fixed contact 527, conductors 814 and 811, motor 511, conductor 810, resistor 535, conductor 812, winding 540 of attack angle anti-engage relay 541, conductor 813, and ground connection 661. Under these conditions the lower brush of motor 511 is positive with respect to the upper brush, causing "reverse" operation of the motor, and the motor current energizes relay 541 as before, interrupting the circuit between contacts 542 and 543.

By reason of the arrangement just described, motor 511 is energized for operation in such a direction as will bring the member in network 151 adjustable thereby into agreement with that adjusted by vane 513, that is, to "balance" the network. As long as relay 520 is in its normal position, this condition is continued.

The output from network 151 is also applied by conductors 820 and 824 and conductors 821 and 825 to MAP control apparatus 362, so that the operation of motors 363 and 364 is further modified in accordance with that output. As long as the attack angle control apparatus is in its centering condition, any displacement of vane 513 is immediately counteracted by operation of motor 511, however, and no appreciable signal is supplied to MAP control apparatus 362.

*Attack angle stabilization*

The next step in the use of the apparatus is for the human pilot to press the attack angle engage button 533. This completes a circuit from the positive terminal of source 10 through conductors 600, 601, 599, and 726, moveable contact 33, fixed contact 31, conductors 727, 721, and 826, moveable contact 547, fixed contact 546, conductors 827 and 830, fixed contact 542, moveable contact 543, conductor 831, fixed contact 140, moveable contact 143, conductor 832, fixed contact 162, moveable contact 165, conductor 833, moveable contact 197, fixed contact 221, conductors 834, 835, and 836, switch 533, conductor 837, winding 521, and attack angle disengage button 532 to ground connection 841.

Relay 520 now operates, interrupting the energization of motor 511 from amplifier 509 at contacts 530 and 526 and at contacts 531 and 527. The relay also completes a holding circuit from conductor 827, which has just been shown to be connected to the positive terminal of the source, through conductor 842, moveable contact 524, and fixed contact 522 to winding 521 of the relay. Moveable contact 524 is electrically connected by a conductor 843 to fixed contact 523, so that when the relay operates a circuit is completed through fixed contact 523, moveable contact 525, conductor 844, and indicating lamp 534 to ground connection 845.

The output from network 151 is now ineffective to operate motor 511, which is thus no longer able to rebalance the network when vane 513 is moved in response to change in the attack angle of the craft. Accordingly the signal from network 151 to control apparatus 362 is now determined by the departure of the actual attack angle, as sensed by vane 513, from the selected attack angle, as established by motor 511 previous to its deenergization.

The apparatus as a whole is now in full operation. The R. P. M. and MAP of the engines are basically stabilized at the values prevailing when the power control relays were energized, subject to modification if the attack angle changes from that prevailing when the attack angle engage relay was operated. Similarly, the pitch, roll, and yaw attitudes of the craft are stabilized against changes from the attitudes prevailing when the elevator, aileron, and rudder engage relays were operated. Manual adjusting devices may of course be manipulated in units 22, 62, 102, 312, 362, and 151 if this is desired.

Note that if elevator disengage button 45 is operated after attack angle stabilization is initiated, the holding circuit for attack angle engage relay 520—which may be traced from the positive terminal through conductors 600, 601, 599, and 726, contacts 33 and 31, conductors 727, 721, and 826, contacts 547 and 546, conductors 827 and 842, contacts 524 and 522, relay winding 521, normally closed switch 522, and ground connection 841—is immediately interrupted at contacts 33 and 31.

*Manual turn control*

If it is desired to permanently change the yaw attitude of the craft—to change its course, for example—this can be done without disengaging the apparatus as a whole, or any part of it. To accomplish this, the human pilot turns the turn control known 130 in the desired direction, thus supplying a voltage of one sense or the other and of a desired magnitude from source 132 to unit 177, through conductor 850, moveable contact 164, fixed contact 161, and conductors 851 and 852. In the deenergized condition of localizer relay 186 the circuit is continued to conductor 180, which is connected to rudder control apparatus 62 by conductor 853 and to aileron control apparatus 102 by conductor 854: the circuits are completed through ground connections 855 and 856 respectively and ground connection 857.

Displacement of turn control known 130 from a central position in either direction also completes a circuit which may be traced from the positive terminal of source 10 through conductors 600, 650, 651, 710, 711, and 860, moveable contact 271, fixed contact 267, conductors 861, 862, 863, moveable contact 196, fixed contact 215, conductors 864, 865, and 866, movable contact 167, fixed contact 166, conductor 868, moveable contact 133, fixed contact 134 or fixed contact 135, conductor 867, and winding 136 of turn control relay 137, the circuit being completed through ground connection 870: the relay accordingly operates.

Operation of turn control relay 137 interrupts, at contacts 142 and 145, an output circuit from source 152 which will presently be traced. At contacts 146 and 147 relay 137 interrupts a switching circuit for control stick 131 which will also be traced presently.

Operation of turn control relay 137 also completes a circuit which may be traced from the positive terminal of source 10 through conductors 600, 650, 651, 710, 711, and 860, moveable contact 271, fixed contact 267, conductor 861, 862, and 863, moveable contact 196, fixed contact 215, conductors 864, 865, and 872, moveable contact 147, fixed contact 150, and conductors 873 and 874 and conductors 621, 627, and 622, to output relay 187 in radio unit 177, the circuit being completed through ground connection 619. As pointed out above, this has no effect by reason of the deenergized condition of localizer relay 186. Caging motor 69 of directional gyroscope 58 is also energized from conductor 621 through conductor 628 and ground connection 629, caging the directional gyroscope and thus permitting permanent change in the heading of the craft.

Operation of the turn control relay 137 also interrupts at contacts 141 and 144 the circuit through which master engage relay 237 may be energized, and at contacts 140 and 143 the initiating circuit for attack angle engage relay 520 is also interrupted.

When the heading of the craft has changed sufficiently, the human pilot returns turn control knob 130 to its central position, the output at source 132 is reduced to zero and the energizing circuit to relay 137 is interrupted, so that the apparatus is restored to its normal operated condition. Directional gyroscope 58 is uncaged and stabilizes the craft about the new heading.

*Full manual attitude control*

It is sometimes desirable to have manual control of the craft available about three axes, such an occasion arising for example when a craft flying in a formation is required to assume its place in a new formation. To avoid the necessity for disengaging the entire apparatus, manually achieving the new position, and then going through the process of reengaging the entire apparatus, control stick 131 is provided for modifying the operation of the automatic pilot. Stick 131 is manually operable about each of three axes 875, 876, 877, and upon displacement from its normal position about the several axes completes circuits including moveable contact 153 and fixed contacts 154 and 155, moveable contact 171 and fixed contacts 173 and 174, and moveable contact 172 and fixed contacts 175 and 176, respectively. Fixed contacts 154, 155, 173, 174, 175, and 176 are connected to fixed contact 146 of turn control relay 137 by a circuit including conductors 890, 891, and 892, and moveable contacts 153, 171, and 172 are connected to winding 156 of relay 157 by a circuit including conductors 893, 894, and 895.

Movement of control stick 131 about axis 875 operates moveable contact 153, and simultaneously controls the supply of voltage from source 152, as described in connection with turn control knob 130 and source 132. Similarly, movement of control stick 131 about axes 876 and 877 may adjust voltages supplied by similar sources, which are not shown for the sake of simplicity in the drawing. The voltage from source 152 is supplied through conductor 899, moveable contact 145, fixed contact 142, and the circuit including conductor 852, localizer relay 186 in its deenergized condition, conductor 180, and conductors 853 and 854 to the rudder and aileron control apparatus, the circuit to source 152 being completed through ground connections 855, 856, and 898.

The operation of moveable contact 153 completes a circuit which may be traced from the positive terminal of source 10 through conductors 600, 650, 651, 710, 711, and 860, moveable contact 271, fixed contact 267, conductors 861, 862, and 863, moveable contact 196, fixed contact 215, conductors 864, 865, and 872, moveable contact 147, fixed contact 146, conductor 890, one of fixed contacts 154 and 155, moveable contact 153, conductors 894 and 895 to winding 156, the circuit being completed through ground connection 896: control stick relay 157 accordingly operates.

Operation of control stick relay 157 interrupts at contacts 161 and 164 the output circuit for source 132 which has previously been described. At contacts 166 and 167 relay 157 interrupts the switching circuit for turn control knob 130, which has also been described. At contacts 167 and 170 relay 157 completes a circuit which may be traced from the positive terminal of source 10 through conductors 600, 650, 651, 710, 711, and 860, moveable contact 271, fixed contact 267, conductors 861, 862, and 863, moveable contact 196, fixed contact 215, conductors 864, 865, and 866, moveable contact 167, fixed contact 170, and conductors 900 and 874 to conductor 621, thence by conductor 628 to caging motor 69 of directional gyroscope 58, and by conductors 627 and 622 to output relay 187 in radio unit 177. As pointed out above, operation of relay 187 has no effect by reason of the deenergization of relay 186.

Operation of relay 157 also interrupts at contacts 160 and 163 the circuit through which master engage relay 237 may be energized, and at contacts 162 and 165 the initiating circuit for attack angle engage relay 520 is also interrupted.

When the craft has been brought into the desired new position, the human pilot returns control stick 131 to its central position, the output of source 152 is reduced to zero, and the energizing circuit to control stick relay 157 is interrupted, so that the apparatus is restored to its normal operative condition.

*The efficiency-approach switch*

If for any reason it is desired to use the settings of voltage dividers 473 and 483 instead of those of voltage dividers 474 and 487, the human pilot moves efficiency-approach switch 234 into its closed or Approach position, completing a circuit which may be traced from the positive terminal of source 10 through conductors 690, 650, 651, 710, switch 234 and conductor 901 to winding 497 of efficiency-approach relay 496, the circuit being completed through ground connection 902. Relay 496 operates, connecting moveable contact 502—which energizes the MAP control apparatus—to slider 475 through fixed contact 504 and conductor 692 instead of to slider 476 through fixed contact 500 and conductor 690, and connecting moveable contact 503—which energizes the R. P. M. control apparatus—to slider 485 through fixed contact 505 and conductor 696 instead of to slider 490 through fixed contact 501 and conductor 693.

*Manual angle selection*

It has been pointed out that if the attack angle and pitch attitude of a craft are fixed, its air speed and rate of climb are also fixed for a given loading. It is frequently desirable in flight to change altitude and air speed, and means for doing this without disengaging the apparatus are provided in attack angle control switch 557 and pitch attitude control switch 47.

Suppose the craft to be in normal automatic flight, that is, in flight at a constant pitch attitude and attack angle and hence a constant air speed and altitude. If now switch 47 is closed momentarily downward, a circuit is completed from the positive terminal of source 10 through conductors 600, 601, and 629, switching contact 50, fixed contact 51, and conductor 609 to motor 24, the circuit being completed through conductor 610, resistor 44, conductor 613, and ground bus 614. Motor 24 operates, adjusting control apparatus 22 so that servomotor 20 is energized to change the elevator settings, raising the nose of the craft until it assumes the selected new pitch attitude. The attack angle of the wing to the horizontal relative wind is increased simultaneously by the same amount. Attack angle vane 513 senses this change in attack angle and increases the thrust of the engines and hence the craft's air speed, until the excess of lift over weight is just enough to result in climbing flight at an angle equal to the angular change in pitch attitude. The attack angle of the craft is now the same as before, and it continues in climbing flight.

If switch 47 is closed momentarily upward, the circuit from conductor 629 is completed to conductor 613 through switching contact 50, fixed contact 52, conductor 608, motor 24, conductors 611 and 612, resistor 43, and conductor 613 to ground bus 614. Operation of the motor in the reverse direction results, and the craft continues in gliding flight: the attack angle is again the same as before.

Suppose again that the craft is in normal automatic flight with switch 47 open, and let attack angle control switch 557 be closed momentarily downward. This completes a circuit which may be traced from the positive terminal of source 10 through conductors 600, 650, 651, 652, 653, 773, 804, and 809, switching contact 560, fixed contact 562, conductors 818 and 811, motor 511, conductor 810, resistor 535, conductor 812, winding 540 of relay 541, conductor 813, and ground connection 661. Motor 511 operates, adjusting attack angle network 151 to give an output on conductors 824 and 825, which in turn energize MAP control apparatus 362. Throttle motors 363 and 364 are energized to close the throttles, reducing the thrust of the engines. The air speed falls off, thus reducing the lift and permitting the craft to change from level flight to gliding flight until the new attack angle resulting from the addition of a vertical component to the relative wind is that selected. The change in air speed may also result in a slight change in pitch attitude of the craft, which is sensed and corrected for by the automatic pilot. The craft continues in gliding flight at a lower air speed, and at the same pitch attitude.

If switch 557 is closed momentarily upward, the circuit from conductor 804 to conductor 812 is completed through conductor 809, switching contact 560, fixed contact 561, conductors 819 and 810, motor 511, conductor 811, and resistor 536. Operation of the motor in the reverse direction results, and the craft continues in climbing flight at a higher air speed and the same pitch attitude.

In tabular form the operation of switches 47 and 557 is as follows:

| | Altitude | Pitch Attitude | Attack Angle |
| --- | --- | --- | --- |
| Switch 47 up | Glide | nose down | same. |
| Switch 47 down | Climb | nose up | same. |
| Switch 557 up | Climb | same | increase. |
| Switch 557 down | Glide | same | decrease. |

Suppose that switches 47 and 557 are both closed momentarily downward. The apparatus is energized to lower the nose of the craft and decrease the attack angle, the former resulting in climbing flight at an increased air speed. If the switches are operated for just the right intervals, the two corrections in rate of climb exactly neutralize one another, and the craft remains at the same altitude. The nature of the apparatus is not such, however, as to result in simultaneous neutralization of the corrections in air speed, and an increase in the craft's air speed results which depends in magnitude on the amount of operation of the two switches.

If switches 47 and 557 are simultaneously closed upward, the reverse action takes place; the altitude of the craft may be maintained constant and its air speed decreased, or the air speed may be maintained constant and the craft caused to climb.

*Outbound radio control*

Now suppose that the craft is so located that its desired course is along the localizer beam but directly away from an airport. To permit automatic following of the beam the human pilot moves function selector 188 to its Out position. Moveable contact 197 now completes its circuit through fixed contact 220 and conductor 908.

Displacement of movable contact 196 from fixed contact 215 interrupts the energization of the switching circuits of control stick 131 and turn control knob 130, and completes a circuit which may be traced from the positive terminal of source 10 through conductors 600, 650, 651, 710, 711, and 860, moveable contact 271, fixed contact 267, conductors 861, 862, and 863, moveable contact 196, fixed contact 214, conductors 903 and 904, moveable contact 232 and fixed contact 231 of relay 225, and conductors 627 and 628 to caging motor 69, which accordingly cages the directional gyroscope. From fixed contact 231 a further circuit may be traced through conductor 622 to output relay 187, so that the larger of the two outputs from radio unit 177 is selected.

Operation of function selector 188 completes another circuit, which may be traced from the positive terminal of source 10 through conductors 600, 650, 651, 710, 711, and 860, moveable contact 271, fixed contact 267, conductors 861 and 905, moveable contact 194, fixed contact 204, conductors 906, 907, and 910, and localizer relay 186, the circuit being completed through ground connection 619. Operation of relay 186 simultaneously energizes conductors 179 and 180 with the localizer receiver output and opens the circuit through conductor 852 from sources 132 and 152 to the rudder and aileron control circuits, so that no operation either of turn control knob 130 or of control stick 131 is effective to change the heading of the craft. The localizer output circuit to the amplifier phase winding of precession motor 224 is completed through ground connections 618 and 619: the precessing motor cannot operate however, since there is no energization of the line phase winding of the motor, the circuit for which will presently be traced; therefore only the rudder and aileron control apparatus are effected.

Since the craft is flying away from rather than toward the localizer transmitter on the ground, and is thus following the regular beam backwards, the sense of the localizer receiver signals is reversed, and reverse operation of the control of the automatic pilot must be provided. This is accomplished by reversing relay 185 in radio unit 177, which is now energized through a circuit which may be traced from the positive terminal of source 10 through conductors 600, 650, 651, 710, 711 and 712, moveable contact 193, fixed contact 200, and conductor 911, the circuit being completed through ground connection 619. Movement of moveable contact 193 out of engagement with fixed contact 201 also interrupts the circuit by which relay 237 is energized.

In the Out position of the function selector it is possible to add, to the normal rudder and aileron control of the craft from the radio, a further precessing control for the directional gyroscope, if gyro switch 233 is operated. The circuit for performing this function may be traced from the positive terminal source 10 through conductors 600, 650, 651, 710, 711, and 860, moveable contact 271, fixed contact 267, conductors 861, 862, and 912, moveable contact 195, fixed contact 210, conductors 913 and 914, gyro switch 233, conductor 915, winding 226 of precession control relay 225, and ground connection 916; relay 225 accordingly operates. It will be recalled that gyro switch 233 is mechanically maintained closed when once manually closed.

Operation of precession control relay 225 deenergizes, at contacts 231 and 232, the circuit energizing caging motor 69 and output relay 187: the latter accordingly reduces the localizer output to its lower level and energizes conductor 179 with this line output. Operation of the precession control relay also completes a circuit for the line phase of precession motor 59 which may be traced from the ungrounded terminal of source 11 through conductors 652 and 917, fixed contact 227, moveable contact 230, and conductor 920 to precession motor 59, the circuit being completed through ground connection 921. Both windings of the motor being now energized, its operation begins and continues as long as there is an output from the localizer receiver, thus bringing about a kind of reset operation in the azimuth portion of the apparatus.

When the craft passes beyond the effective range of the localizer transmitter, the human pilot switches function selector 188 to its Off position, re-establishing the normal condition of the apparatus and automatically opening gyro switch 233 through a mechanical connection 923 if it was closed.

*Inbound radio control*

When the craft comes within the effective range of a localizer transmitter whose beam it is desired to follow to the station, function selector 188 is manually adjusted into its In position. The only difference between the apparatus in this position of the function selector and the apparatus in the Out position of the function selector is that reverse relay 185 is not energized, and the sense of the localizer signal is therefore not reversed.. Moveable contact 197 of the function selector now completes its circuit through fixed contact 222 and conductor 918, moveable contact 196 completes its circuit through fixed contact 216 and conductor 919, moveable contact 195 completes its circuit through fixed contact 212 and conductor 928, and moveable contact 194 completes its circuit through fixed contact 206 and conductor 929.

*Radio control in glide*

When the craft intersects the beam of the glide path transmitter, as is indicated to the human pilot in the conventional fashion, he advances the function selector to its Glide position. The energization of localizer relay 186 in radio control unit 177, through moveable contact 194 of the function selector, is maintained through fixed contact 207 and conductor 938.

Precession control relay 225 is energized through a circuit which may be traced from the positive terminal of source 10 through conductors 600, 650, 651, 710, 711, and 860, moveable contact 271, fixed contact 267, conductors 861, 862, and 912, moveable contact 195, fixed contact 213, conductor 922, winding 226 of the relay, and ground connection 916. It will be evident that this circuit is completed regardless of whether or not switch 233 is closed. The human pilot in checking the operation of the system is accustomed to considering the position of switch 233 as an indication of whether or not the directional gyroscope is being precessed, however, and accordingly switch 233 is automatically actuated into its closed position by mechanical connection 923 whenever the function selector is in its Glide position, and can be opened only by returning the function selector to Off.

Operation of relay 225 makes the precession motor of the directional gyroscope effective, uncages the gyroscope, and reduces the effective output from the localizer receiver as it is applied to the rudder control apparatus and aileron control apparatus, all as described above.

Switch 234 is also closed by a mechanical connection 924 whenever the function selector is moved to Glide but the mechanical connection is such that the switch is not opened by any movement of the function selector.

The circuit for energizing master engage relay 237 is again interrupted at contacts 193 and 201 when the function selector is in Glide, and a new circuit is completed which may be traced from the positive terminal of source 10 through conductors 600, 650, 651, 710, 711, and 712, moveable contact 193, fixed contact 203, conductors 924, 925, and 926, moveable contact 270, fixed contact 266, conductor 927 and glide relay 184 in radio control unit 177, the circuit being completed through ground connection 619.

When relay 184 is energized, a signal determined by the output of the glide path receiver is supplied at 181 to attack angle network 151, where it is effective to change the selected attack angle whenever the craft departs from the desired glide path: this is in addition to the normal operation of the attack angle network. This arrangement may if desired include the addition of a fixed change in selected attack angle equal to the glide path angle if desired, as taught in the copending application of Ross C. Alderson and Oscar Hugo Schuck, Serial No. 68,238, filed December 30, 1948, and assigned to the assignee of the present application, which now has matured into Patent 2,798,682.

The circuit energizing the switches of the turn control knob and the control stick is interrupted at contacts 196 and 215, and is true in the In and Out positions of the function selector. One further change accomplished by moving the function selector to Glide is interruption, at contacts 197 and 223, of the operating circuit for attack angle engage relay 520.

*Go-around operation*

Now if the craft is making a landing on a carrier and is given a wave-off, the human pilot momentarily actuates go-around button 285. By this means a circuit is completed which may be traced from the positive terminal of source 10 through conductors 600, 650, 651, 710, 711, and 712, moveable contact 193, fixed contact 203, conductors 924 and 930, switch 285, conductors 931 and 932, windings 261 and 274, and ground connection 933: go-around relay 260 is accordingly energized.

Operation of relay 260 completes a holding circuit through fixed contact 262 and moveable contact 264, which are connected directly across go-around switch 285, so that release of the button does not cause relay 260 to drop out. The normal circuit energizing moveable contacts 194, 195, and 196 of the function selector is interrupted at contacts 271 and 267, so that precession control relay 225 and localizer relay 186 are deenergized, the former interrupting precession of the directional gyroscope and the latter discontinuing radio control from the localizer receiver and re-establishing the circuit for control of rudder and ailerons by the turn control knob and control stick. That circuit was also interrupted previously by movement of moveable contact 196 away from fixed contact 215, but is now reenergized through a new circuit which may be traced from the positive terminal of source 10 through conductors 600, 650, 651, 710, 711, and 934, moveable contact 265, fixed contact 263 and conductor 935 to conductor 865, whence the circuit is as in the normal operation of the apparatus.

The glide relay 184 is deenergized at contacts 270 and 266 of go-around relay 260, and a new circuit is completed which may be traced from the positive terminal of source 10 through conductors 600, 650, 651, 710, 711, and 712, moveable contact 193, fixed contact 203, conductors 924, 925, and 926, moveable contact 270, fixed contact 272, conductors 936 and 657 to winding 545 of lockout relay 544, the circuit being completed through conductor 660 and ground connection 661. Relay 554 is thus energized, the operating and holding circuits for attack angle engage relay 520 are interrupted at contacts 546 and 547, and the relay 520 drops out. Lamp 534 is deenergized thereby at contacts 523 and 525, and energization of motor 511 from amplifier 509 is reestablished at contacts 530 and 526 and contacts 531 and 527: thereafter no appreciable signal from network 151 appears in MAP control apparatus 362, regardless of change in actual attack angle, because the change is balanced out of the network as fast as it occurs by operation of motor 511.

Operation of relay 260 also energizes go-around lamp 286 through a circuit which may be traced from the positive terminal of source 10 through conductors 600, 650, 651, 710, 711, and 860, moveable contact 271, fixed contact 273, and conductor 937, the circuit being completed through ground connection 940.

Operation of relay 260 also substitutes the voltages on sliders 470 and 484 for those on sliders 475 and 483, by disengaging moveable contacts 281 and 282 from fixed contacts 277 and 280 and moving them into engagement with fixed contact 283 and 284. Sliders 470 and 484 are not influenced by the initial setting of lever 493, so a preselected maximum go-around power setting is always available when relay 260 is actuated.

The go-around condition of operation of the apparatus continues as long as function selector 188 remains at Glide. The attitude of the craft is freed from the radio control unit 177 and is made subject to the control stick and turn control knob; the power control is maintained at a fixed value, and the attack angle responsive apparatus is disabled. When the function selector is moved back to Off, after the craft has regained a safe altitude, the circuit to the go-around relay is interrupted at contact 203. The apparatus resumes normal operation, except that the attack angle apparatus is disengaged and must be reengaged in the usual fashion.

*Summary*

The operation of the apparatus having been completely described, the features of safety inherent in the interlocking connections of the various elements will now be reemphasized. In the first place it is clear that the automatic pilot cannot be put in operation if the turn control, control stick, or function selector are not in their inoperative positions. The power stabilizing apparatus cannot be put into operation independently of the automatic pilot, because no separate means for engaging relays 410 and 422 is provided. If any one of the control surface engage relays or the power control relays is disengaged by use of its disengage button, it can be reengaged only by operation of the master engage button 235, which re-establishes full operation of the system. This is of advantage in preventing uncoordinated control of the craft.

The attack angle apparatus can have no effect on the MAP control apparatus unless at least one power control relay and the elevator engage relay are engaged, and its effect is interrupted if this condition once established ceases for any reason.

Moreover, operation of the attack angle apparatus cannot be initiated if the function selector is in Glide, or if either the control stick or the turn control knob is displaced from its central position, or if the attack angle network is unbalanced, although none of these contingencies, if arising after the attack angle engage relay has operated, will cause it to drop out.

It is impossible for either the control stick or the turn control knob to affect the operation of the apparatus if the function selector is not at Off. If the control stick is moved to control the craft, subsequent movement of the turn control knob is ineffective to change the operation of the apparatus, and the reverse is equally true.

It is impossible because of mechanical connection 924 to go into a glide with the "efficiency" power settings, and conversely it is impossible because of mechanical connection 923 to retain precession of the directional gyroscope when the function selector is turned back to Off.

It is impossible to operate the go-around relay unless the function selector is in the Glide position, and when once operated the go-around relay cannot be released until the function selector is moved out of the Glide position. When operated, the go-around relay performs most of the functions of the function selector in its Off position.

These features of safety and convenience made possible by the interlocking control arrangement disclosed above result in the achievement of the objects expressed in the beginning of this specification. It will be evident that the invention provides means for operating the control surfaces and power settings of a craft automatically to maintain a desired attitude and a selected attack angle, that control of this operation is transferable in a number of ways, and that safety interlocks including a function selector, the several engage relays, and the turn control knob, the control stick, and the reset, go-around, precession control, and attack angle antiengage relays, are provided to insure that the various control functions are performed only in the proper sequence, or at least that they are not automatically performed in any dangerous sequence.

In the foregoing discussion, and in the drawing, the invention has been specifically disclosed in a propeller driven craft having reciprocating engines, but the invention is by no means limited to this single application. When craft powered by turbo-prop, turbo-jet, ram-jet, and rocket engines are to be controlled according to the invention, the problem while different in detail, remains basically unaltered. The differences in detail inhere in the nature of the different power plants and of the means for controlling them.

In a reciprocating engine, for example, engine temperature is a limiting factor rather than a control factor, and the mixture lever is used only when a major change in the operation of the engine is contemplated: the same is generally true of turbo-prop engines. In turbo-jet and ram-jet engines there is no mixture control, and the power supplied is regulated by a fuel flow adjustment and sometimes by a tail cone. In rocket engines the only control is at present that of fuel flow.

The characteristics of reaction engines are such that operation below a minimum power is erratic. The inertia of an aircraft is large and changes in engine power are reflected in craft performance only after an interval of delay. An appreciable interval is required to accelerate turbine engines even apart from the craft. These three semi-independent facts have led to the development of speed brakes, or drag flaps, and lift spoilers, which are devices which reduce the efficiency of the craft's airfoils so as to waste a variable portion of the power of the engine and the power represented by inertia of the craft. Smooth control of a craft requires control of these units as well as the actual fuel flow, propeller pitch, mixture, etc. In the claims below the word "power" is intended to be used broadly enough to include engine power and craft inertia, and "power control" is used to refer not only to engine power control means such as throttles, R. P. M. levers, tail cones, and jet thrust spoilers, but also to drag flaps or speed brakes and lift spoilers.

Numerous objects and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim as my invention:

1. Apparatus for aircraft control comprising, in combination: first and second stabilizing means normally actuating the attitude and power control members respectively of an aircraft to produce flight of the aircraft in a desired attitude and direction and at a desired airspeed and rate of climb; manual control means for operation to override the effect of said first stabilizing means to bring about desired changes in the attitude of the aircraft; first automatic control means, responsive to departure of the aircraft from a desired path, for operation to override the effect of said first stabilizing means so as to return the aircraft to the desired path; second automatic control means, responsive to deviation of the attack angle of the aircraft from a desired value, for operation to override said second stabilizing means so as to restore the attack angle of the aircraft to the desired value; further control means adapted to override said second stabilizing means to establish an arbitrary condition of power output; selecting means connected to said stabilizing means and said manual and automatic control means and having a first condition, in which said manual control means is connected to override said first stabilizing means and said second automatic control means is connected to override said second stabilizing means, and a second condition, in which said first automatic control means is connected to override said first stabilizing means and said second automatic control means is connected to override said second stabilizing means; switching means connected to said stabilizing means, said manual control means, said further control means and said selecting means and having an inoperative condition and an operative condition, in which latter condition said manual control means is connected to override said first stabilizing means and said further control means is connected to override said second stabilizing means, regardless of the condition of said selecting means; and means connected to said selecting means and said switching means and preventing said switching means from being actuated into its operative condition unless said selecting means is in its second condition.

2. Apparatus for aircraft control comprising, in combination: first and second stabilizing means normally actuating the attitude and power control members respectively of an aircraft to produce flight to the aircraft in a desired attitude and direction and at a desired airspeed and rate of climb; manual control means for operation to override the effect of said first stabilizing means to bring about desired changes in the attitude of the aircraft; first automatic control means, responsive to departure of the aircraft from a desired path, for operation to override the effect of said first stabilizing means so as to return the aircraft to the desired path; second automatic control means, responsive to deviation of the attack angle of the aircraft from a desired value, for operation to override said second stabilizing means so as to restore the attack angle of the aircraft to the desired value; further control means adapted to override said second stabilizing means to establish an arbitrary condition of power output; selecting means connected to said stabilizing means and said manual and automatic control means and having a first condition, in which said manual control means is connected to override said first stabilizing means and said second automatic control means is connected to override said second stabilizing means, and a second condition, in which said first automatic control means is connected to override said first stabilizing means and said second automatic control means is connected to override said second stabilizing means; switching means connected to said stabilizing means, said manual control means, said further control means, and said selecting means and having an inoperative condition and an operative condition, in which latter condition said manual control means is connected to override said first stabilizing means and said further control means is connected to override said second stabilizing means, regardless of the condition of said selecting means; and means connected to said selecting means and said switching means for preventing said switching means from being actuated into its operative condition unless said selecting means is in its second condition, and for preventing said switching means from being rendered inoperative by actuation of said selecting means out of its second condition and into its first condition after said switching means has once been made operative.

3. Apparatus for controlling a powered aircraft, having a plurality of attitude control members and a plurality of effective power control members for at least one propelling power plant, comprising, in combination: stabilizing means normally actuating the attitude control members of the craft to produce flight in a fixed attitude and direction; first automatic control means responsive to departure of the aircraft from a desired path, for operation to override the effect of said stabilizing means so as to return the aircraft to the desired path; selecting means connected to said stabilizing means and said automatic control means and having a first condition in which said automatic control means is disconnected from said stabilizing means and a second condition in which said first automatic control means is connected to said stabilizing means; motor means for separately adjusting said power control members in accordance with a set of signals; power control means unitarily adjustable to supply first and second sets of variable signals for said last named means; second automatic control means connected to said motor means and responsive to deviation of the attack angle of the craft from a selected value, for controlling the operation of said power control members; manually operable switching means connected to said motor means and said power control means and having a first operative condition, in which the first set of signals is supplied to said motor means, and a second operative condition, in which the second set of signals is supplied to said motor means, so as to control said motor means in first and second distinguishable fashions; and means connected to said selecting means and said switching means for causing said switching means to supply said first set of signals to said motor means when said selecting means is in said second condition and for preventing manual operation of said switching means, the signals of said first and second sets respectively being so chosen as to give first and second distinguishable conditions of flight of the aircraft.

4. Apparatus for controlling a powered aircraft, having a plurality of attitude control members and a plurality of effective power control members for at least one propelling power plant, comprising, in combination: stabilizing means normally actuating the attitude control members of the craft to produce flight in a fixed attitude and direction; first automatic control means responsive to departure of the aircraft from a desired path, for operation to override the effect of said stabilizing means so as to return the aircraft to the desired path; selecting means connected to said stabilizing means and said automatic control means and having a first condition in which said first automatic control means is disconnected from said stabilizing means and a second condition in which said first automatic control means is connected to said stabilizing means; motor means for separately adjusting said power control members in accordance with a set of signals; power control means unitarily adjustable to supply first and second sets of variable signals for said last named means; second automatic control means connected to said motor means and responsive to deviation of the attack angle of the craft from a selected value, for controlling the operation of said power control members; manually operable switching means connected to said motor means and said power control means and having a first operative condition, in which the first set of signals is supplied to said motor means, and a second operative condition, in which the second set of signals is supplied to said motor means, so as to control said motor means in first and second distinguishable fashions and means connected to said selecting means and said switching means for enabling said switching means to be manually operated to supply to said motor means either of said sets of signals, when said selecting means is in said first condition, and for ensuring that said switching means supplies said first set of signals to said motor means, and preventing manual operation of said switching means, when said selecting means is in said second condition, the signals of said first and second sets respectively being so chosen as to give first and second distinguishable conditions.

5. Apparatus of the class described comprising, in combination: means responsive to departure, from a selected value, of the attack angle of an aircraft, which varies with the attitude and power of the aircraft; adjustable means normally stabilizing said attitude and said power, respectively; control means operable out of a normal state to cause adjustment of said attitude stabilizing means so as to vary the attitude stabilized thereby; means causing initiation and maintenance of adjustment of said power stabilizing means in accordance with the response of the first named means; means preventing said initiation of adjustment if said control means is not in said normal state; and means preventing operation of said last named means if said control means is operated out of said normal state after responsive adjustment of said power stabilizing means has been initiated.

6. Apparatus of the class described comprising, in combination: means responsive to departure, from a selected value, of the attack angle of an aircraft, which varies with the pitch attitude and power of the aircraft; adjustable means normally stabilizing said attitude and said power, respectively; a control stick operable out of a normal state to cause adjustment of said pitch attitude stabilizing means so as to vary the pitch attitude stabilized thereby; means causing initiation and maintenance of adjustment of said power stabilizing means in accordance with the response of the first named means; means preventing said initiation of adjustment if said control stick is not in said normal state; and means preventing operation of said last named means if said control stick is operated out of said normal state after responsive adjustment of said power stabilizing means has been initiated.

7. Aircraft control apparatus comprising, in combination: engageable attitude control means operable when engaged to stabilize an attitude of an aircraft about a selected value; engageable power control means operable when engaged to stabilize the power available in the aircraft at a selected value; responsive means supplying a signal in accordance with the attack angle of the aircraft; means for connecting said responsive means to said power control means, for supplying thereto an overriding signal to vary said selected value; and means preventing operation of said last named connecting means unless both said control means are engaged.

8. Aircraft control apparatus comprising, in combination: engageable power control means operable when engaged to stabilize the power available in the aircraft at a selected value; means adapted to be connected to said power control means for supplying thereto an overriding signal to vary said selected value; responsive means supplying a signal in accordance with the attack angle of the aircraft; means for connecting said responsive means to said power control means, for supplying thereto an overriding signal to vary said selected value; and means preventing operation of said last named connecting means unless said power control means is engaged.

9. Aircraft control apparatus comprising, in combination: engageable attitude control means operable when engaged to stabilize an attitude of an aircraft about a selected value; engageable power control means operable when engaged to stabilize the power available in the aircraft at a selected value; responsive means supplying a signal in accordance with the attack angle of the aircraft; means for connecting said responsive means to said power control means, for supplying thereto an overriding signal to vary said selected value; and means preventing operation of said last named connecting means unless said attitude control means is engaged.

References Cited in the file of this patent

UNITED STATES PATENTS

| | | |
|---|---|---|
| 2,322,225 | Crane et al. | June 22, 1943 |
| 2,429,642 | Newton | Oct. 28, 1947 |
| 2,466,702 | Hamby | Apr. 12, 1949 |
| 2,471,821 | Kutzler et al. | May 31, 1949 |
| 2,474,618 | Divoll | June 28, 1949 |
| 2,532,936 | Peterson | Dec. 5, 1950 |
| 2,553,983 | Saxman | May 22, 1951 |
| 2,592,173 | Noxon et al. | Apr. 8, 1952 |
| 2,595,250 | Harcum | May 6, 1952 |
| 2,611,128 | Pine et al. | Sept. 16, 1952 |
| 2,634,391 | Rusler | Apr. 7, 1953 |
| 2,636,699 | Jude et al. | Apr. 28, 1953 |
| 2,676,770 | Schuck | Apr. 27, 1954 |
| 2,681,777 | Rossire | June 22, 1954 |